United States Patent [19]

Brown et al.

[11] Patent Number: 4,872,545
[45] Date of Patent: Oct. 10, 1989

[54] APPARATUS FOR HANDLING BODIES OF GENERALLY CYLINDRICAL CONFIGURATION

[75] Inventors: Stephen C. N. Brown, Preston; Andrew W. Ashley, Plymouth, both of United Kingdom

[73] Assignee: British Nuclear Fuels plc, Warrington, United Kingdom

[21] Appl. No.: 194,214

[22] Filed: May 16, 1988

[30] Foreign Application Priority Data

Jun. 5, 1987 [GB] United Kingdom ............. 8713213

[51] Int. Cl.[4] .......................................... B65G 47/24
[52] U.S. Cl. ................................. 198/394; 198/415
[58] Field of Search ................. 198/394, 399, 415; 209/545

[56] References Cited

U.S. PATENT DOCUMENTS

| | | | |
|---|---|---|---|
| 1,972,489 | 9/1939 | Rideout et al. | 198/399 |
| 2,637,433 | 5/1953 | Shuttleworth | 198/415 |
| 2,769,274 | 9/1956 | Griswold et al. | 198/415 X |
| 3,068,989 | 12/1962 | Packman et al. | 198/415 X |

FOREIGN PATENT DOCUMENTS 61-226414 10/1986 Japan .

Primary Examiner—Johnny D. Cherry
Assistant Examiner—Edward M. Wacyra
Attorney, Agent, or Firm—William R. Hinds

[57] ABSTRACT

Cylindrical bodies 12 are brought into end-to-end relationship on a conveyor 30 (FIG. 7) by means of a second conveyor 42 running at a different speed, which may be greater than or less than the speed of conveyor 30. The conveyor 42 serves to flip misorientated bodies (see FIGS. 6C, 6D) into an orientation in which their axes are parallel to the feed direction C of the conveyor 30. A modified arrangement (FIG. 10) is described for bodies with length to diameter ratios of the order of 0.8:1. Other handling devices are also described for effecting single streaming of bodies starting from a randomly distributed array (FIG. 1), for separating bodies of different sizes from each other (FIGS. 2 and 3) and for transferring bodies from one conveyor to another (FIGS. 4 and 5).

21 Claims, 4 Drawing Sheets

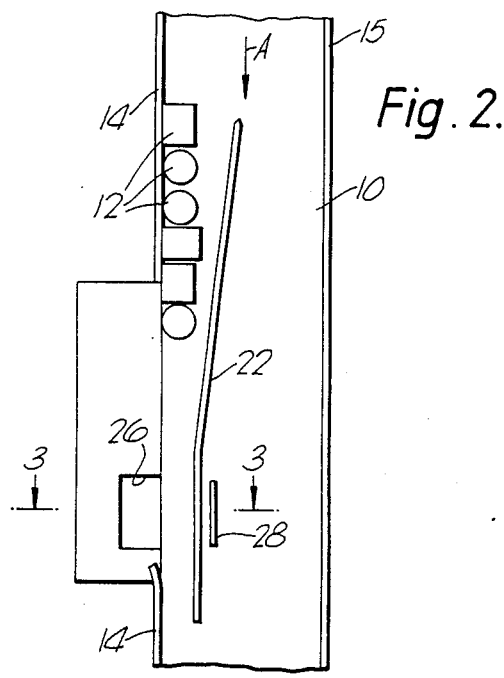
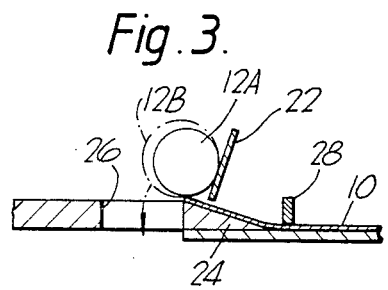
Fig. 2.
Fig. 3.
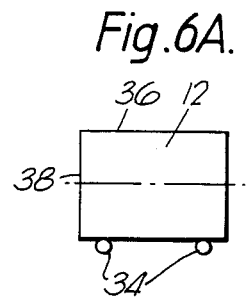
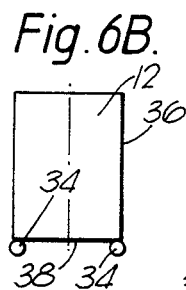
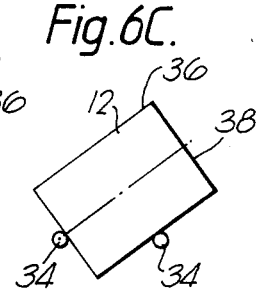
Fig. 6A.  Fig. 6B.  Fig. 6C.
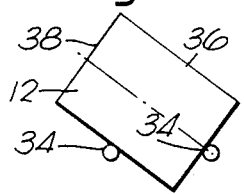
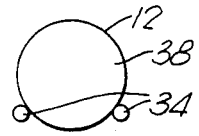
Fig. 6D.  Fig. 6E.

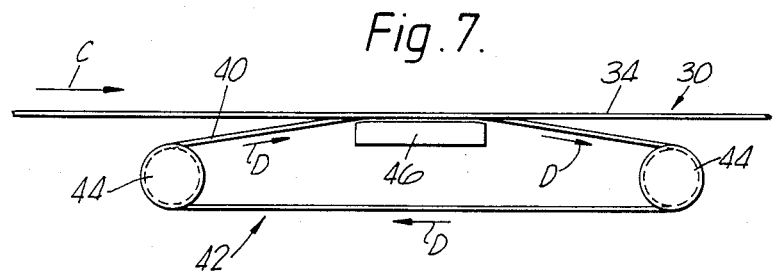
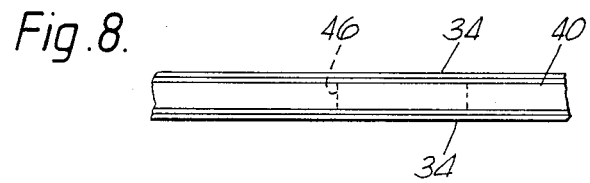
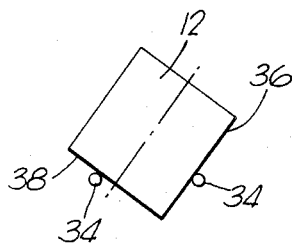 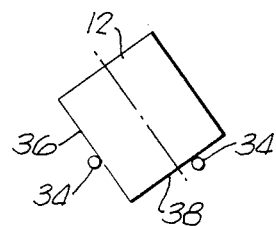
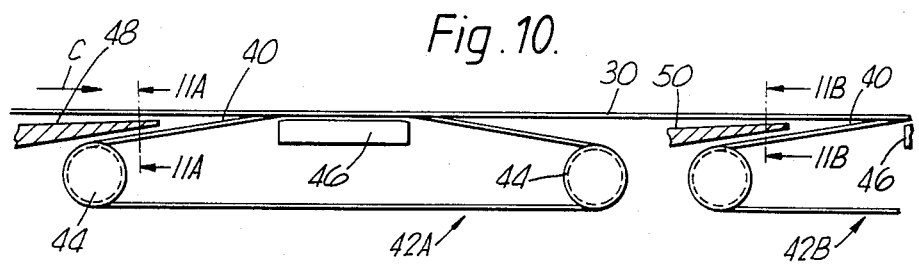
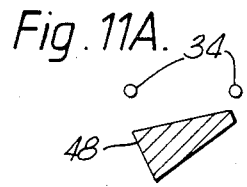 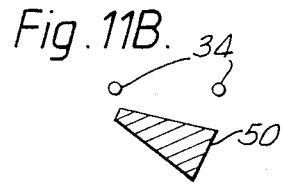

APPARATUS FOR HANDLING BODIES OF GENERALLY CYLINDRICAL CONFIGURATION

FIELD OF THE INVENTION

This invention relates to apparatus for handling bodies of generally cylindrical configuration. The invention is particularly, but not necessarily exclusively, applicable to the handling of nuclear fuel pellets, the term "nuclear fuel pellets" being used herein in a loose sense to include, in addition to pellets of fissile material, pellets of other materials having nuclear characteristics, e.g. fertile and/or neutron-absorbing materials.

BACKGROUND OF THE INVENTION

One problem encountered in the nuclear fuel manufacturing industry is that of automatically forming the pellets, after for example compaction and sintering, into a stack or column with the pellets in end-to-end alignment with or without spaces between the pellets.

FEATURES AND ASPECTS OF THE INVENTION

According to the present invention there is provided apparatus for handling bodies of generally cylindrical configuration comprising:

(a) means for conveying the bodies in serial fashion along a predetermined path, the conveying means being arranged to support the bodies in one or other of two stable modes, a first mode in which the body is contacted by the conveying means at different points around its generally cylindrical surface such that the body axis extends generally parallel to the direction of conveyance and a second mode in which the body is contacted by the conveying means at both its cylindrical surface and one of its end faces such that the body is supported in tilted fashion with its axis extending laterally of the direction of conveyance; and (b) reorientating means disposed at at least one position along the path of conveyance for contacting those bodies (if any) in said second mode of support while allowing those bodies in said first mode of support to remain in that mode.

Preferably the or each re-orientating means includes a moving body-contacting element having a component of velocity in said direction of conveyance which differs from that of the conveying means, i.e. the body-contacting element may have a component of velocity in said direction of conveyance which is less than or exceeds that of the conveying means.

The moving element is conveniently arranged to be available constantly for contact with bodies in the second mode of support. The moving element may be in the form of a driven endless element having a body-contacting run extending alongside and generally parallel to the conveying means.

Preferably the or each orientating means is arranged to exert a progressive lifting action on the bodies during the contact phase between the bodies and the re-orientating means and for this purpose the or each re-orientating means may be arranged to contact the lowermost extremities of said bodies.

In a preferred embodiment, there are first and second re-orientating means disposed in succession in the direction of conveyance.

The first and second re-orientating means are preferably preceded by first and second means respectively for changing the angle of tilt of those bodies in the second mode of support, the first tilt-changing means being arranged to effect a tilt in one sense and the second tilt-changing means being arranged to effect a tilt in the opposite sense.

Each tilt-changing means may comprise an obliquely inclined surface which progressively approaches said conveying means in the direction of conveyance for contact with those bodies in the second mode of support, the surface preceding the first re-orientating means being inclined in the opposite direction to that preceding the second re-orientating means.

The conveying means conveniently comprises a pair of spaced generally parallel endless suports which form a generally horizontal conveyor run and serve to support said bodies therebetween in at least said first and second modes, said supports being driven at substantially the same speed. The supports may comprise endless wires, belts or the like entrained around pulleys.

According to another aspect of the invention there is provided apparatus for handling bodies of generally cylindrical configuration, comprising means for channelling a two dimensional distribution of said bodies into a stream in which the bodies are arranged in serial fashion, the channelling means comprising conveying means for feeding the bodies in a predetermined direction and first and second channelling walls which converge in said predetermined direction and are arranged to intercept the bodies as they are fed in said predetermined direction, the first and second channelling walls converging together to provide an exit opening through which said bodies can pass one at a time only, at least one of the channelling walls or part thereof being movable in such a way that, on contact with bodies accumulating in the region of the exit opening, reverse feed motion is imparted to such bodies to assist free flow of the bodies through the exit opening.

The movable wall may be constituted by one run of an endless belt conveyor arranged with its belt substantially perpendicular to the support surface of said conveying means. The body-contacting side of the belt is conveniently toothed.

According to another aspect of the invention there is provided apparatus for handling bodies of generally cylindrical configuration and adapted to discriminate between bodies having dimensions above and below a predetermined value, the apparatus including conveyor means for feeding the bodies in serial fashion, means for locating the bodies alongside one edge of the supporting surface of said conveying means and separating means comprising a surface spaced inwardly of said one edge in such a way that bodies having a diameter or diameters above a predetermined value are rendered unstable and fall off said conveying means whilst those having a diameter or diameters less than said predetermined value remain stable and remain supported by said conveying means.

The marginal edge portion along which the bodies are located may, in the vicinity of said separating means, be inclined downwardly in a direction away from said edge.

BRIEF DESCRIPTION OF THE DRAWINGS

The invention will now be described by way of example only with reference to the accompanying drawings, in which:

FIG. 2 is a plan view of a pellet-spacer separating zone;

FIG. 3 is a sectional view in the direction 3—3 in FIG. 2;

FIGS. 6A–6E illustrate different attitudes for cylindrical pellets having a length to diameter ratio greater than unity;

FIG. 7 is a side view of a pellet-reorientating apparatus;

FIG. 8 is a fragmentary plan view of the apparatus of FIG. 7;

FIGS. 9A and 9B illustrate two different attitudes for cylindrical pellets having a length to diameter ratio less than unity;

FIG. 10 is a modification of the apparatus of FIG. 7 for use with shorter pellets; and FIGS. 11A and 11B are sectional views in the directions 11A—11A and 11B—11B in FIG. 10.

DESCRIPTION OF THE PREFERRED EMBODIMENT

Although not limited thereto, the following description is given with specific reference to the handling of cylindrical nuclear fuel pellets from unloading of the pellets from a sintering boat, following passage through a pellet sintering furnace, through to organising the pellets into end-to-end alignment in preparation for subsequent processing or handling operations such as pellet diameter grinding, loading of the pellets onto grooved storage trays and, possibly direct loading of the pellet sack into the tubular cladding or fuel can.

Figure 1:
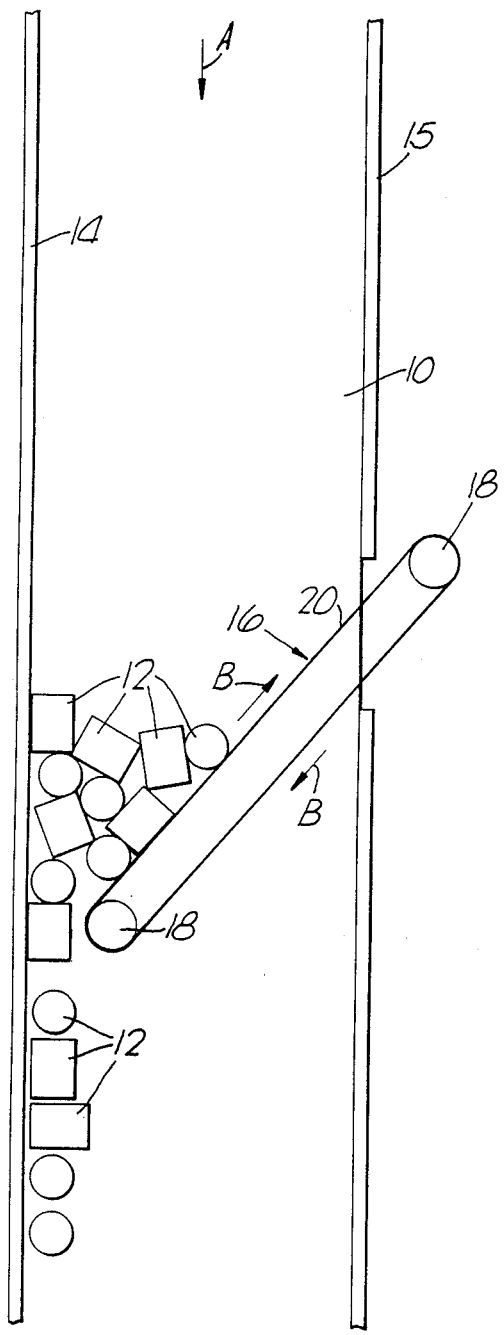
FIG. 1 is a plan view of apparatus for single streaming zone for pellets and spacers.

For passage through the sintering furnace, the pellets are loaded in layers into a molybdenum boat and adjacent layers are separated by trays which, in turn, are spaced apart by clindrical molybdenum spacers which are approximately 20% larger dimensionally than the pellets following pellet shrinkage during sintering. On completion of the sintering stage and cooling, the pellets along with the spacers are deposited on to a generally horizontal conveyor belt 10 (see FIG. 1). At this stage, the pellets and spacers (both depicted by reference numeral 12 in FIG. 1) are more or less randomly orientated and spread across the width of the belt 10 with some components lying on their sides and some standing on their ends. The conveyor belt 10 is bordered along its edges by side walls 14, 15.

The belt 10 feeds the randomly orientated array of pellets and spacers towards and through a pellet-streaming zone from which the pellets and spacers emerge as a single stream. This is effected by means of a jam-breaking conveyor belt 16 which is entrained around pulleys 18 so as to extend obliquely across the path of travel of the pellets/spacers. One of the pulleys is driven by a motor (not shown) so that the belt 16 travels in the direction indicated by arrows B, i.e. with the upstream run 20 of the belt 16 travelling generally in the opposite direction to the direction of pellet spacer feed. The angle of inclination of the belt 16 relative to feed direction A may, if desired be adjustable and its outer face may be toothed or otherwise suitably profiled.

The belt 16 is spaced from the side wall 14 to define a gap through which the pellets/spacers may only pass one at a time. Any tendency for the pellets and spacers to jam at the apex of the cone formed between the sidewall 14 and the conveyor belt 16 is overcome by the counter-travel of the belt run 20 since this serves to set up a recirculatory motion of pellets and spacers in the vicinity of the gap through which the pellets and spacers are intended to pass. If desired, the gap between which the pellets pass may be defined by a pair of jam-breaking conveying belts, both conveniently being inclined to the direction of travel of the main conveyor belt 10.

Following single-streaming, the pellets/spacers are fed to a pellet-spacer separating zone (see FIGS. 2 and 3) at which the sidewall 14 is interrupted while the pellets/spacers are displaced laterally of the feed direction A by a guide 22 and the belt 10 is tilted or, alternatively the edge of the belt 10 is caused, by wedge-shaped former 24, to slope inwardly (see FIG. 3) in such a way that the smaller dimensioned pellets 12A can remain on the belt 10 but the larger dimensioned spacers 12B topple off the belt 10 and through hole 26 for collection and re-use in boat-loading. FIG. 3 shows the pellet 12A and spacer 12B with their axes parallel to direction A but the arrangement is such that the same effect (i.e. spacers toppling, pellets remaining on the belt) is obtained whether the pellets/spacers lie on their sides or stand on their ends. Reference numeral 28 depicts a presser bar for assisting the belt 10 to conform with the former 24 as the belt edge passes over the latter. If desired, a deflector may be provided on the guide 22 at a height above the belt which allows the pellets to pass without contact with the deflector but which contacts the larger dimensioned spacers and deflects them off the belt 10 and through the hole 26.

Figure 4:
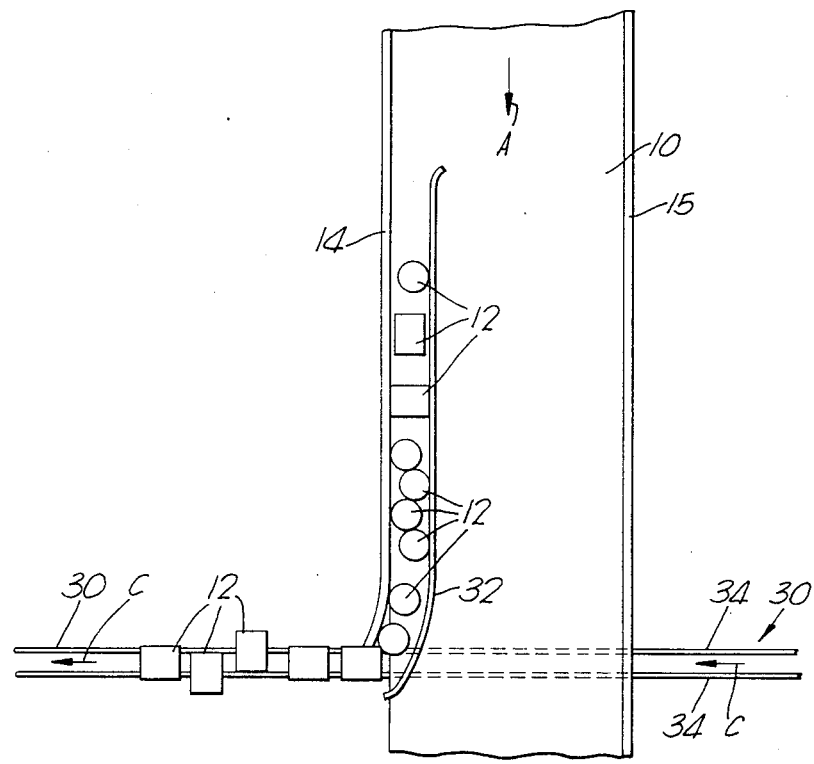
FIG. 4 is a plan view of a pellet-transferring zone.
Figure 5:
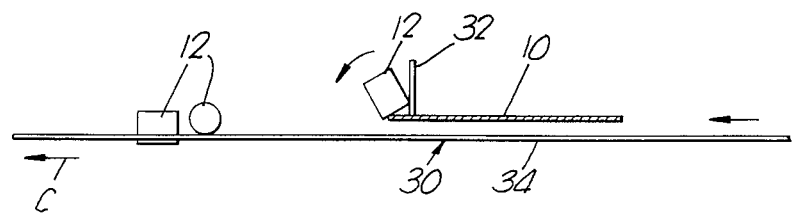
FIG. 5 is an end view of the transferring zone in FIG. 4.

Following traverse of the pellet-spacer separating zone, the pellets 12 continue to be fed by the belt 10 in the direction A to a pellet-transfer zone (see FIGS. 4 and 5) in which the pellets are transferred from the belt 10 onto a conveyor 30. The transfer is effected by guiding the pellets 12 to the edge of the belt 10 by means of guide 32 to such an extent that the pellets topple off the belt 10 immediately above the conveyor 30 and hence fall onto the belt 30 for further feed in the direction C.

The conveyor 30 comprises a pair of spaced, parallel co-extensive wires 34 looped around pulleys (not shown) to form upper and lower conveyor runs, the upper run only being shown since this is the pellet-conveying run. The spacing between the wires 34 is such that the pellets can be supported in a number of stable (or quasi-stable) positions as shown in FIGS. 6A-6E. The desired position is that of FIG. 6E in which the axis of the cylindrical pellet is parallel to the feed direction C, i.e. the wires 34 contact the pellet along its cylindrical surface only. The positions of FIGS. 6C and 6D can arise and are substantially stable positions in which one wire 34 contacts the cylindrical pellet surface 36 while the other wire contacts the pellet end face 38. The positions of FIG. 6A and 6B are less stable and, in practice because of vibrations inherent in the conveyor drive, the pellets in these attitudes soon topple into the more stable attitudes of FIGS. 6C and 6D. If necessary, a vibratory device may be included to ensure this.

The objective is to bring all of the pellets into end-to-end relation, i.e. with each pellet having the attutude of FIG. 6E. This is achieved by flipping the pellets having the attitudes shown in FIGS. 6C and 6D to that of FIG. 6E by means of an element with respect to which the conveyor 30 has a relative velocity in the direction C. As shown in FIGS. 7 and 8, the element is constituted by the upper run 40 of an endless conveyor belt 42 entrained around pulleys 44, one of which is a drive pulley arranged to drive the belt in the direction indicated by arrows D in FIG. 7. The upper belt run 40 is caused, by stripper block 46, to follow a path in which it progressively approaches the conveyor 30 from underneath, then reaches a plateau in which it runs parallel to conveyor 30 with the belt of conveyor 42 located between the wires 34 and thereafter inclines downwardly from the conveyor 30.

Over the length of the plateau section, the upper surface of the run 40 is at a level, with respect to the conveyor 30, such that the run 40 contacts the lowermost extremities of pellets in the attitudes of FIGS. 6C–6E and lifts the pellets to a small degree without causing them to topple off the conveyor 30. Such contact between the run 40 and pellets having the desired attitude of FIG. 6E will leave the pellet orientation unchanged. However, in the case of pellets having the attitudes of FIGS. 6C and 6D, such contact will (by virtue of the differential velocity existing between the belt 40 and the conveyor 30) result in a slight lifting and turning action being imparted to such pellets thereby flipping them into the desired attitude of FIG. 6E.

The velocity of the belt 42 may advantageously be greater than that of conveyor 30 (typically a 2:1 ratio) over the plateau region since the flipping action of the pellet is then accompanied by an acceleration in the direction C thereby creating a gap between successive pellets to accommodate the greatest dimension (i.e. along a diagonal) of the flipped pellet. However, it is feasible for the velocity of the belt 42 to be less than that of the conveyor 30 (e.g. 1:2) and still result in a flipping action if the pellets are suitably spaced.

The embodiment of FIGS. 7 and 8 is intended for the case where the pellet length to diameter ratio is somewhat greater than unity (e.g. 1.1:1 or greater). Where the pellet length to diameter ratio is somewhat less (e.g. 0.8:1) a modified approach is necessary as will now be explained. Referring to FIGS. 9A and 9B, these show the stable attitudes corresponding to FIGS. 6C and 6D but for a shorter pellet. With a shorter pellet, the pellet end face 38 tends to be less inclined to the horizontal than the pellet cylindrical surface 36. For successful flipping of the pellets to occur, the shorter pellets need to be tilted about the point of contact between the wire 34 and the pellet cylindrical surface in a direction which decreases the inclination of the cylindrical surface 36.

The modified arrangement of FIGS. 10, 11 and 11A is designed to cater for shorter (as well as longer) pellets. In this arrangement, two conveyors 42A, B are employed each of which may be as described with reference to FIGS. 7 and 8 and each is preceded by a pellet-tilting former 48,50 which serve respectively to tilt the pellets in the attitudes of FIGS. 9A and 9B into orientations in which the pellet cylindrical surfaces 36 are less steeply inclined so that these surfaces (rather than the pellet end faces) are more predominantly presented towards the belt runs 40 as the latter approach their plateau regions. Thus the former 48 tilts the pellet attitude of FIG. 9A in a clockwise direction while the former 50 tilts the pellet attitude of FIG. 9B in a counterclockwise direction. In this way, the first conveyor 42A in conjunction with the former 48 is instrumental in flipping shorter pellets having the FIG. 9A attitude into the desired attitude (see FIG. 6E) while the second conveyor 42B, in conjunction with the former 50, flips pellets having the FIG. 9B attitude to the desired attitude.

We claim:

1. Apparatus for handling bodies of generally cylindrical configuration comprising:
   (a) means for conveying the bodies in serial fashion along a predetermined path, the conveying means being arranged to support the bodies in one or other of two stable modes, a first mode in which the body is contacted by the conveying means at different points around its generally cylindrical surface such that the body axis extends generally parallel to the direction of conveyance and a second mode in which the body is contacted by the conveying means at both its cylindrical surface and one of its end faces such that the body is supported in tilted fashion with its axis extending laterally of the direction of conveyance, and
   (b) reorientating means disposed at at least one position along the path of conveyance for contacting those bodies (if any) in said second mode of support and exerting a progressive lifting action on the bodies during the contact phase between the bodies and the reorientating means so as to cause a reorientating of said second mode bodies into the first mode of support while allowing those bodies in said first mode of support to remain in said first mode.

2. Apparatus as claimed in claim 1 in which the or each reorientating means includes a movable element for contacting said second mode bodies, the movable element having a component of velocity in said direction of conveyance which differs from that of the conveying means.

3. Apparatus as claimed in claim 2 in which the movable element component of velocity is less than that of the conveying means.

4. Apparatus as claimed in claim 2 in which the movable element component of velocity exceeds that of the conveying means.

5. Apparatus as claimed in claim 2 in which said movable element is arranged to be available constantly for contact with said second mode bodies.

6. Apparatus as claimed in claim 2 in which said movable element is in the form of a driven endless element having a body-contacting run extending alongside and generally parallel to the conveying means.

7. Apparatus as claimed in claim 1 in which the or each said reorientating means is arranged to contact the lowermost extremities of said bodies.

8. Apparatus as claimed in claim 1 in which the conveying means comprises a pair of spaced generally parallel endless supports which form a generally horizontal conveyor run and serve to support said bodies therebetween in at least said first and said second modes, said supports being driven at substantially the same speed.

9. Apparatus as claimed in claim 8 in which said supports comprise endless wires, belts or the like entrained around pulleys.

10. Apparatus for handling bodies of generally cylindrical configuration comprising:
    (a) means for conveying the bodies in serial fashion along a predetermined path, the conveying means being arranged to support the bodies in one or other of two stable modes, a first mode in which the body is contacted by the conveying means at different points around its generally cylindrical surface such that the body axis extends generally parallel to the direction of conveyance and a second mode in which the body is contacted by the conveying means at both its cylindrical surface and one of its end faces such that the body is supported in tilted fashion with its axis extending laterally of the direction of conveyance; and (b) first and second reorientating means disposed along the path of conveyance and in succession in the direction of conveyance for contacting those bodies (if any) in said second mode of support so as to cause a reorientating of said second mode bodies into the first mode of support while allowing those bodies in said first mode of support to remain in that mode, said first and said second reorientating means being preceded by first and second means respectively for changing the angle of tilt of said second mode bodies, the first tilt-changing means being arranged to effect a tilt in one sense and the second tilt-changing means being arranged to effect a tilt in the opposite sense.

11. Apparatus as claimed in claim 10 in which each said tilt-changing means comprises an obliquely inclined surface which progressively approaches said conveying means in the direction of conveyance for contact with said second mode bodies, the surface preceding the first reorientating means being inclined in the opposite direction to the surface preceding the second reorientating means.

12. Apparatus as claimed in claim 11 in which the first and the second reorientating means are arranged to exert a progressive lifting action on the bodies during the contact phase between the bodies and said first and said second reorientating means.

13. Apparatus as claimed in claim 12 in which the conveying means comprises a pair of spaced generally parallel endless supports which form a generally horizontal conveyor run and serve to support said bodies therebetween in at least said first and said second modes, said supports being driven at substantially the same speed.

14. Apparatus as claimed in claim 13 in which each said reorientating means includes a movable element for contacting said second mode bodies, the movable element having a component of velocity in said direction of conveyance which differs from that of the conveying means.

15. Apparatus as claimed in claim 14 in which said movable element is in the form of a driven endless element having a body-contacting run extending alongside and generally parallel to the conveying means.

16. Apparatus as claimed in claim 15 in which each said reorientation means is arranged to contact the lowermost extremities of the bodies.

17. Apparatus as claimed in claim 10, in which the first and the second reorientating means are arranged to exert a progressive lifting action on the bodies during the contact phase between the bodies and said first and said second reorientating means.

18. Apparatus as claimed in claim 17 in which the conveying means comprises a pair of spaced generally parallel endless supports which form a generally horizontal conveyor run and serve to support said bodies therebetween in at least said first and said second modes, said supports being driven at substantially the same speed.

19. Apparatus as claimed in claim 18, in which each said reorientating means includes a movable element for contacting said second mode bodies, the movable element having a component of velocity in said direction of conveyance which differs from that of the conveying means.

20. Apparatus as claimed in claim 19 in which said movable element is in the form of a driven endless element having a body-contacting run extending alongside and generally parallel to the conveying means.

21. Apparatus as claimed in claim 20 in which each said reorientation means is arranged to contact the lowermost extremities of the bodies.

* * * * *